United States Patent [19]

Ward

[11] 4,164,122

[45] Aug. 14, 1979

[54] CYLINDER CONSTRUCTION AFFORDING AUTOMATIC RE-PHASING OF MASTER AND SLAVE CYLINDERS

[75] Inventor: Gerald G. Ward, Naperville, Ill.

[73] Assignee: International Harvester Company, Chicago, Ill.

[21] Appl. No.: 834,628

[22] Filed: Sep. 19, 1977

[51] Int. Cl.[2] .............................................. B60T 13/00

[52] U.S. Cl. .................................... 60/547 R; 60/583; 60/593; 91/171; 91/520

[58] Field of Search ................. 60/546, 583, 593, 547; 91/399, 171, 189 A, 402, 520

[56] References Cited

U.S. PATENT DOCUMENTS

| | | | |
|---|---|---|---|
| 3,190,077 | 6/1965 | Scholin | 91/399 |
| 3,347,043 | 10/1967 | Freese | 60/546 |
| 3,648,568 | 3/1972 | Wright | 92/5 R |
| 3,901,130 | 8/1975 | Lange | 91/399 |

FOREIGN PATENT DOCUMENTS

| | | | |
|---|---|---|---|
| 41-17711 | 1/1966 | Japan | 91/399 |
| 547650 | 9/1942 | United Kingdom | 60/546 |

*Primary Examiner*—Abraham Hershkovitz

*Attorney, Agent, or Firm*—Ronald C. Kamp; F. David AuBuchon

[57] ABSTRACT

An improved master cylinder in which a pair of orifices extend through the cylinder wall and means is provided on the exterior of the cylinder to permit fluid communication therebetween. The orifices are located near the end of the cylinder to permit restricted flow around the piston in the master cylinder when it is near or at the end of its stroke to cause both the master and slave piston to complete their strokes and at substantially the same time. A similar pair of orifices and an exterior communication means at the other end of the cylinder provides for re-phasing during piston movement in the opposite direction.

6 Claims, 2 Drawing Figures

CYLINDER CONSTRUCTION AFFORDING AUTOMATIC RE-PHASING OF MASTER AND SLAVE CYLINDERS

BACKGROUND AND SUMMARY OF THE INVENTION

This invention relates to a master fluid power cylinder capable of performing useful work while simultaneously controlling the coordinated operation of an associated slave cylinder or cylinders which also perform useful work. In such combinations, it is often required that the pistons and the rods of the two cylinders start their movement at the same time, travel at substantially the same velocity, and reach the ends of their respective strokes at substantially the same time. This is necessary, for example, when two such cylinders are used to raise and lower opposite ends of the reel on a combine. Uniform movement, if desired, is achieved by sizing the master and slave cylinders so the rod end volume of the master is equal to the head end volume of the slave cylinder or cylinders. It should be understood that this alternatively can be accomplished by using the same size cylinders and designing the associated mechanical linkages to accommodate the differing strokes.

It also should be understood that this invention is applicable to systems having a master cylinder and any number of slave cylinders in a series mode. In such systems a single re-phasing valve would be required at either end of the cylinder as determined by use preference and the master cylinder and all slave cylinders typically would be double acting cylinders, such as shown in my application Ser. No. 830,713 filed Sept. 6, 1977 and entitled "Plow System".

However, wear of the working parts, particularly the fluid seal, cause the cylinders to get out of synchronization. That is, when hydraulic fluid within the system leaks out or leaks around seals from one section of the system to another, the predetermined relationship between the piston and rod and master cylinders will be disturbed. When this occurs the cylinders are said to be out of phase and the operation for correcting this condition is called "re-phasing". Mechanisms for automatically re-phasing hydraulic cylinders are disclosed in U.S. Pat. No. 3,347,043 issued to E. G. Freese and U.S. Pat. No. 3,832,852 issued to L. W. Schmucker. The device of the former patent restricts the location of the fitting on the cylinder (precluding a design in which the fittings are located on the ends of the cylinder, for example), requires precise location of the fitting relative to the port and orifice in the cylinder wall and tends to weaken the cylinder wall by placing the large port in close proximity to the orifice. In addition if the master cylinder is not provided with wear rings, a load transverse to the axis of the piston rod acting on the outer end of the piston rod will deform the seal bringing the piston into metal to metal contact with the cylinder wall in the vicinity of the orifice. When this occurs, the re-phasing function will be defeated, requiring either the use of more expensive wear rings in the piston of the master cylinder or relocation of the fittings around the periphery of the cylinder. The use of slots or grooves on the interior of the cylinder wall, as suggested by the latter of the aforementioned patents, also has a slight tendency to weaken the cylinder wall, but more importantly necessitates flow of the fluid necessary for rephasing past the piston seal per se. Even though the time duration during which flow takes place is relatively small, repeated cycling of the cylinder subjects the seal to a higher potential for erosion damage.

It is therefore an object of this invention to provide a master cylinder construction which is relatively strong, which permits the use of normal standard fittings positioned most expeditiously for fluid flow ingress to and egress from the cylinder and which provides good life for the seal of the master cylinder piston. It is also an object of this invention to provide a master cylinder construction in which the means for re-phasing can be positioned around the periphery of the master cylinder to minimize the adverse effects of external forces on the cylinder rod.

These and other objects and many of the intended advantages of the present invention will become more readily apparent upon a perusal of the accompanying specification and the accompanying drawings wherein:

FIG. 1 is a schemmatic of a master slave cylinder arrangement, including a central longitudinal sectional view of a master cylinder according to the present invention; and FIG. 2 is a fragmentary cross sectional view of another embodiment of the present invention.

DESCRIPTION OF PREFERRED EMBODIMENTS

Figure 1:
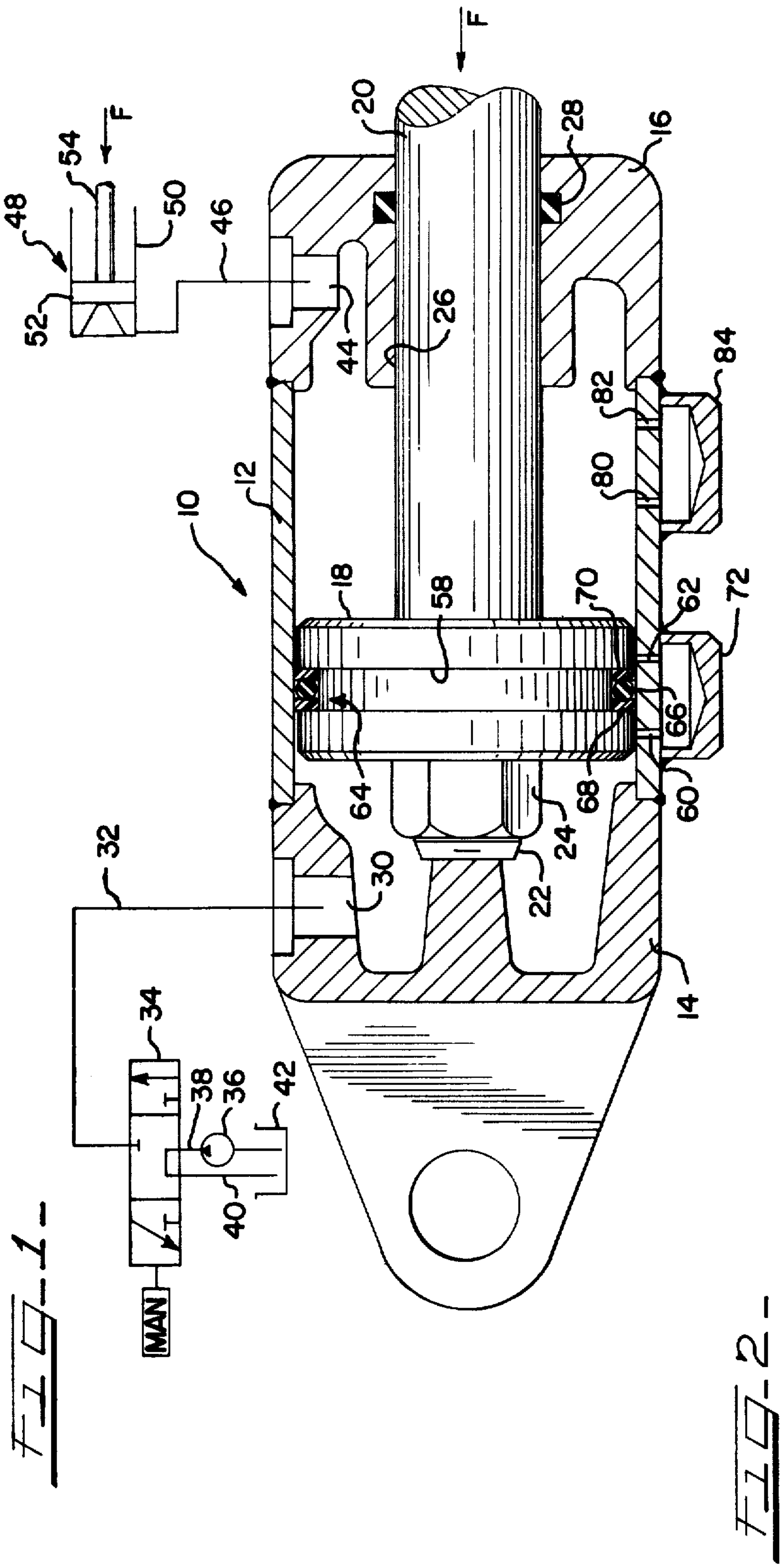

A cylinder construction which embodies the present invention is shown in FIG. 1 and is designated generally by the numeral 10. The master cylinder 10 includes a tubular central member 12 secured to the head end member 14 and the rod end of gland member 16. A piston 18 is secured to piston rod 20. Piston rod 20 has a threaded reduced diameter section 22 forming a shoulder and a piston 18 is trapped between the shoulder and a nut 24 engaging the threaded section 22. The rod 20 extends through an opening 26 formed in the rod end member 16 and a seal 28 carried by the rod end member engages the rod 20 to prevent leakage of fluid from the interior of the master cylinder 10.

A port 30 is provided in the head end member 14 and is connected by conduit 32 to valve 34. Valve 34 is a three position manually actuated valve which is connected to a pump 36 in supply conduit 38. A return conduit 40 provides communication between the valve 34 and a reservoir 42. When the valve 34 is in the position shown in FIG. 1, the conduit 32 is blocked and the master cylinder is hydraulically locked. When the valve 34 is shifted to the left, as viewed in FIG. 1, conduit 38 is placed in fluid communication with conduit 32 directing hydraulic fluid pressure from the pump 36 through conduit 32 to the port 30 and into the head end side of the master cylinder 10. When the valve 34 is shifted to the right, as viewed in FIG. 1, conduit 32 is connected with the conduit 40 permitting fluid on the head end side of piston 18 to be exhausted to the reservoir 42. Since the master cylinder 10, as shown in FIG. 1, is a one-way acting cylinder, the retraction of the piston 18 within the tubular member 12 requires the application of an external force that has at least a component in the direction indicated by the arrow F.

A port 44 in the rod end member 16 is connected by conduit 46 with the head end side of a slave cylinder, indicated generally at 48. Slave cylinder 48 includes a cylindrical member 50 within which a piston 52 is reciprocably mounted. The piston rod 54 is secured to the piston 52 and extends outwardly from the cylindrical member 50. The cylinders 10 and 48 are sized and proportioned so that the volume displaced by the rod end side of the piston 18 in the master cylinder 10 is equal to the volume on the head end side of the slave cylinder 48. When the valve 34 is moved to the left, the piston 18 and rod 20 will be extended and the fluid displaced by such movement will be exhausted through the port 46 to the head end side of the slave cylinder 48 causing the piston 52 and its rod 54 to be extended in unison with the piston 18 and the rod 20 of the master cylinder 10. When the valve 34 is moved to the right, both the master cylinder 10 and slave cylinder 48 will be permitted to be retracted, the fluid on the head side of piston 18 being exhausted to reservoir 42 through conduit 32 while the fluid on the head end side of slave cylinder 48 is exhausted through conduit 48 into the rod end side of master cylinder side of the master cylinder 10. When the valve 34 is shifted to the right, as viewed in FIG. 1, conduit 32 is connected with the conduit 40 permitting fluid on the head end side of piston 18 to be exhausted to the reservoir 42. Since the master cylinder 10, as shown in FIG. 1, is a one-way acting cylinder, the retraction of the piston 18 within the tubular member 12 requires the application of an external force that has at least a component in the direction indicated by the arrow F.

A port 44 in the rod end member 16 is connected by conduit 46 with the head end side of a slave cylinder, indicated generally at 48. Slave cylinder 48 includes a cylindrical member 50 within which a piston 52 is reciprocably mounted. The piston rod 54 is secured to the piston 52 and extends outwardly from the cylindrical member 50. The cylinders 10 and 48 are sized and proportioned so that the volume displaced by the rod end side of the piston 18 in the master cylinder 10 is equal to the volume on the head end side of the slave cylinder 48. When the valve 34 is moved to the left, the piston 18 and rod 20 will be extended and the fluid displaced by such movement will be exhausted through the port 46 to the head end side of the slave cylinder 48 causing the piston 52 and its rod 54 to be extended in unison with the piston 18 and the rod 20 of the master cylinder 10. When the valve 34 is moved to the right, both the master cylinder 10 and slave cylinder 48 will be permitted to be retracted, the fluid on the head end side of piston 18 being exhausted to reservoir 42 through conduit 32 while the fluid on the head end side of slave cylinder 48 is exhausted through conduit 48 into the rod end side of master cylinder 10.

A pair of orifices 60 and 62 extend through the tubular member 12. These orifices are positioned longitudinally on the cylinder to be adjacent to and either side of the seal assembly 64 carried by the piston 18 when the piston 18 is at or near the limit of its contraction stroke. The seal assembly is retained within a groove 58 formed on the piston 18 and is composed of an O-ring 66 with backup rings 68 and 70 positioned on either side thereof to prevent extrusion of the O-ring into the gap between the piston 18 and the interior wall of the tubular member 12. A hollow cap 72 is sealingly secured, such as by welding, to the exterior of the tubular member 12 and provides fluid communication between the orifices 60 and 62.

A second pair of orifices 80 and 82 are provided near the other end of the tubular member and are longitudinally positioned thereon so that the orifices are adjacent to and located on either side of the seal assembly 64, when the piston rod is fully extended. A second hollow cap 84 is secured to the outer surface of the tubular member 12 and provides fluid communication between the orifices 80 and 82.

Figure 2:
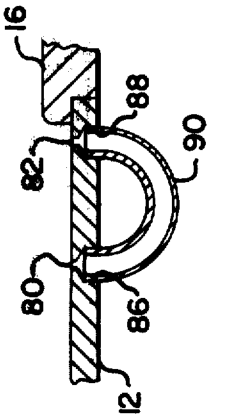

Another form of fluid communication for the paired orifices 60, 62 and 80, 82 is shown in FIG. 2. While FIG. 2 illustrates the alternative form of fluid communication for the paired orifices 80 and 82, it will be understood that a similar arrangement could be used in connection with the paired orifices 60 and 62. As shown in FIG. 2, the orifice 80 has been counterbored at 86 and the orifice 82 counterbored as at 88. A U-shaped tube 90 is inserted in the counterbores and provides fluid communication between the orifices 80 and 82. In order to preclude the necessity of welding or otherwise securing the tube 90 to the tubular member 12, the diameters of the counterbores 86 and 88 can be dimensioned to be sightly less than the exterior diameter of the tube 90 and the tube 90 then forced into the counterbores 86 and 80 with an interference fit.

The paired orifices, with their associated exterior fluid communication means, are completely independent of the normal ports used in a master cylinder. Consequently the plumbing normally required, which is schemmatically represented by conduits 32 and 46 FIG. 1, can be arranged in the most expeditious manner with regard to the proper clearance for, and freedom from interference with those components of the machine with which the master cylinders are associated. Since the paired orifices are independent, they can be readily located around the periphery of the member 12 so that those anticipated loads imposed on the rod 20 transverse to its axis will not cause the piston to seal one of the orifices and thereby render the rephasing function inoperative. It is also apparent that the seal assembly in the master cylinder piston is completely isolated from that flow necessary for re-phasing. The life of the seal assembly will not be adversely affected by any erosion damage that might otherwise occur if the flow for rephasing were directly past the seal assembly itself.

It is to be understood that the foregoing description is of two preferred embodiments and that changes and modifications may be made without departing from the spirit and scope of the invention as defined by the appended claims.

What is claimed is:

1. In a master cylinder construction for use with a slave cylinder, said master cylinder having:

a tubular central member;

a head end member secured to said central member and having a first port for selectively communicating with a fluid pressure source or a fluid reservoir;

a rod end member secured to said central member and having a second port communicating with the slave cylinder;

a piston having a seal assembly reciprocably mounted within said central member; and a piston rod secured to said piston and extending through said rod end member; the improvement affording automatic rephasing of said master and slave cylinder consisting essentially of:

a first pair of orifices extending through said central member and positioned longitudinally along said central member so that said first orifices are adjacent to and on either side of said seal assembly when said piston is fully retracted, and first means carried on the exterior of said central member to provide direct and unobstructed fluid communication between said first pair of orifices.

2. A master cylinder construction according to claim 1, and further consisting essentially of:

a second pair of orifices extending through said central member and positioned longitudinally along said central member so that said second orifices are adjacent to and on either side of said seal assembly when said piston is fully extended; and second means carried on the exterior of said central member to provide direct and unobstructed fluid communication between said second pair of orifices.

3. A master cylinder construction according to claim 1, wherein said first means consists essentially of a hollow cap secured to the exterior of said tubular member.

4. A master cylinder construction according to claim 1, wherein said first means consists essentially of a U-shaped tube carried by said tubular member and interconnecting said first pair of orifices.

5. A master cylinder construction according to claim 2, wherein each of said first and second means consists essentially of a hollow cap secured to the exterior of said tubular member.

6. A master cylinder construction according to claim 2, wherein each of said first and second means consists essentially of a U-shaped tube carried by said tubular member and interconnecting the associated pair of orifices.

* * * * *